(12) United States Patent
Dutschke

(10) Patent No.: US 6,533,105 B1
(45) Date of Patent: Mar. 18, 2003

(54) GRAIN AUGERS AND THE LIKE

(76) Inventor: Reginald Vernon Dutschke, Box 88, Brinkworth 5464 (AU)

( * ) Notice: Subject to any disclaimer, the term of this patent is extended or adjusted under 35 U.S.C. 154(b) by 0 days.

(21) Appl. No.: 09/701,978

(22) PCT Filed: Jun. 3, 1999

(86) PCT No.: PCT/AU99/00428

§ 371 (c)(1),
(2), (4) Date: Dec. 4, 2000

(87) PCT Pub. No.: WO99/62797

PCT Pub. Date: Dec. 9, 1999

(30) Foreign Application Priority Data

Jun. 4, 1998 (AU) .............................. PP3899

(51) Int. Cl.⁷ .............................................. B65G 33/26
(52) U.S. Cl. ...................................................... 198/659
(58) Field of Search .................... 198/659, 674, 198/666; 192/70.27

(56) References Cited

U.S. PATENT DOCUMENTS

| | | | | | |
|---|---|---|---|---|---|
| 1,559,527 | A | * | 10/1925 | Spase | 192/55.5 |
| 2,045,757 | A | * | 6/1936 | Constantin | 198/657 |
| 2,438,637 | A | * | 3/1948 | Jansen | 175/323 |
| 2,447,319 | A | * | 8/1948 | Fourchambault | 192/105 C |
| 3,381,801 | A | * | 5/1968 | Rastoin | 198/659 |
| 3,696,639 | A | * | 10/1972 | Gore et al. | 116/283 |
| 3,709,357 | A | * | 1/1973 | Brown | 198/659 |
| 3,710,591 | A | * | 1/1973 | Gore et al. | 464/39 |
| 3,722,666 | A | * | 3/1973 | Ulm et al. | 198/550.1 |
| 3,726,392 | A | * | 4/1973 | Rastoin | 198/659 |
| 3,727,746 | A | * | 4/1973 | Slusher | 198/659 |
| 4,219,316 | A | * | 8/1980 | Feng | 415/72 |
| 4,535,884 | A | * | 8/1985 | Suppan | 198/626.2 |
| 4,798,280 | A | * | 1/1989 | Hornhardt et al. | 198/666 |
| 4,842,126 | A | * | 6/1989 | McConnell | 198/666 |
| 5,099,986 | A | * | 3/1992 | Kuzub | 198/659 |
| 5,110,015 | A | * | 5/1992 | Kilts | 222/413 |
| 5,355,199 | A | * | 10/1994 | Bray | 399/256 |
| 5,899,319 | A | * | 5/1999 | Jarnagin | 198/666 |

FOREIGN PATENT DOCUMENTS

| | | |
|---|---|---|
| DE | 3002326 A | 8/1980 |
| DE | 3922195 A | 1/1991 |
| EP | 51550 A | 5/1982 |
| SU | 1801888 A1 | 3/1993 |
| SU | 18033690 A1 | 3/1993 |

* cited by examiner

Primary Examiner—Joseph E. Valenza
Assistant Examiner—Richard Ridley
(74) Attorney, Agent, or Firm—Brown Martin Haller & McClain LLP

(57) ABSTRACT

The invention relates to a material conveying assembly (10) of the kind comprising an outer tubular casing (11) and a rotary feed screw (12) mounted within the casing (11) on a tubular drive shaft (13), wherein the intake end of the auger is provided with a replacement intake auger sub-assembly (14) comprising flexible helical flighting (15) freely rotatably mounted on a drive shaft extension (17) which is connected to the main drive shaft (13) and a clutch device (30) which drivingly connects the intake flighting shaft portion (25) to the drive shaft extension (17). The clutch device is arranged so that it will automatically disengage drive to the shaft portion (25) in the event of an overload occurring. A soft pliable extension sleeve (19) is co-axially fitted over the open leading end of the outer casing (11) and is arranged to encircle a portion of the intake flighting (15). The extension sleeve (19) being easily deformable, in combination with the resilient flexible flighting (15) significantly reduces the likelihood of any injury being suffered by an operator in the event of one of his or her limbs being caught in the intake flighting.

34 Claims, 5 Drawing Sheets

GRAIN AUGERS AND THE LIKE

This invention relates to new and useful improvements to augers, in particular an auger used for conveying grain and other particulate material. More specifically the invention relates to a material conveying auger having an improved intake designed for increased safety of persons working in the near vicinity thereof.

Conventional grain augers comprise a tubular or cylindrical rigid outer casing or housing in which is housed a rotary feed screw having a constant diameter rigid metal helical flight which extends from an intake at one end of the casing to a discharge end at the opposite end of the casing. In many instances, the intake end of the auger, ie where the grain is fed into the auger, a portion of the auger flighting is exposed and projects outwardly from the outer casing, with the outer end of the main auger shaft being journalled in an end bearing assembly which itself is supported by a plurality of circumferentially spaced longitudinal support rods which are fixed to the casing and project beyond the open intake end of the casing. The projecting support rods provide partial shielding around the intake end of the auger for preventing a limb, eg a hand or leg, being accidentally caught in the auger intake end flighting. However, it is not uncommon for an operator of a grain auger to lose a finger, or even part of an arm, as a result of insufficient safety guards at the auger intake end during operation of the auger. It will be appreciated that the intake flighting where it enters the open end of the rigid metal outer casing and the end edge of the rigid casing effectively function as a slicer and will readily slice an obstruction, eg a finger, which becomes trapped therebetween, especially when the edges of the metal casing and metal flighting become sharpened through wear from use.

It is also known for manufacturers of grain augers to fit protective guards or shields over the auger intake end in order to minimise the likelihood of injury to the operator; however, it has been found that the use of such guards around the intake end of the auger interferes with the pick-up and conveyance of the material which reduces the working capacity of the auger. As a result, operators quite often remove the shields or guards, and of course, once removed, there is the potential for a serious injury.

A further problem with existing farm augers is that there is no safeguard for stopping the rotation of the flighting in the event of an obstruction engaging within the intake end or the intake end becoming choked with material, eg fertiliser. In cases where the obstruction is a foreign object such as a fertiliser bag, the object can be conveyed into the section of the auger casing where it can be difficult to remove should jamming of the auger occur. It would be advantageous if the auger was designed so that its intake end flighting stopped rotating in an overload situation, while still permitting the downstream portion of the auger to continue rotating so as to help clear the overload before the intake flighting resumed its rotation. In the situation where the obstruction is a person's limb, eg leg or arm, it is vital that drive to the intake end flighting cease virtually instantaneously.

It is an object of the present invention to provide an improved auger assembly which is designed so that the likelihood of any serious injury being suffered by an operator (or any other person in the vicinity of the auger intake end) in the event of his or her leg or arm (or a part thereof) accidentally being caught in the auger intake end, is drastically reduced.

It is another object of the present invention to provide an improved auger assembly which incorporates a safety overload prevention device which will operate to disengage drive to the intake flighting should an overload occur, eg as a result of an obstruction, such as a leg or arm, becoming trapped in the auger intake.

It is a still further object of the present invention to provide a safety clutch mechanism for the intake end of an auger assembly which is easy to assemble and maintain and which an be easily disengaged for servicing purposes.

It is a still further object of the present invention to provide a replacement auger intake section which can be readily fitted to an existing auger for improving its operating safety by minimising the risk of injury being suffered by an operator should one of his limbs, or a part thereof, become caught in the auger intake end, and one which allows an operator to readily change the intake flighting where a different pitch is required.

It is yet a still further object of the present invention to provide an improved auger intake unit which is simple in construction, economical to manufacture and .which does not materially affect the capacity of the auger to convey material therealong.

According to one aspect of this invention therefore, there is provided an improved material conveying auger assembly of the type which includes an elongate tubular casing having an intake end and a discharge end, a drive shaft extending coaxially through the casing and journalled for rotation therein, and helical flighting on said drive shaft, the improvements comprising (i) a replacement auger intake section adapted for connection to the drive shaft so as to rotate therewith, said intake section having helical flighting formed of resilient flexible wear resistant material and (ii) a soft, pliable tubular extension sleeve attachable to the intake end of said casing so as to project axially outwards therefrom, said extension sleeve being arranged to encircle at least a portion of said intake section and its flighting.

Preferably the intake end flighting is formed of polymeric material, eg polyurethane, having a Shore "A" hardness value in the range 60–100, most desirably a value of around 90.

Desirably the extension sleeve is formed of a rubber or rubber-like material having a Shore "A" hardness value in the range 35–60, most desirably a value of 45. Generally, the extension sleeve will be formed of a durable material which is quite softer and more pliable than the material of the intake flighting but at the same time possess sufficient radial stiffness to support itself under operating conditions.

Preferably the extension sleeve is slidably fitted over the open intake end of the casing and is clamped thereto by releasable clamping means.

The resiliently deflectable intake end flighting and the soft rubber extension sleeve at the intake end of the auger casing eliminate the sharp metal edges normally present in a conventional auger and thereby greatly minimise the likelihood of a serious injury being suffered should a person's limb or limbs become caught in the intake end of the auger. With the arrangement of the present invention, it has been shown that even with the auger rotating at speeds in the order of 400–500 rpm, a person's fingers can be trapped in the intake end flighting and subsequently withdrawn therefrom without serious injury or damage. The soft rubber sleeve portion of the auger casing at the intake end thereof, being easily deformable, will allow the fingers, caught by the intake flighting to be pulled out without serious consequences.

Preferably the extension sleeve has associated therewith a feed tray portion which projects axially away from the outer end of the sleeve and extends along the underside of the intake section. The tray may be a separately formed member and have its own attachment means for attaching it to the auger casing, or the tray can be integrally formed with the extension sleeve.

According to another aspect of the invention, there is provided a safety clutch mechanism arranged to drivingly connect the auger intake flighting section to the main auger shaft so that the intake flighting, under normal operating conditions, will rotate simultaneously with the main auger shaft or, in the event of an obstruction becoming caught in the intake end of the auger, drive to the intake flighting will be disengaged and the intake flighting will be stationary relative to the main auger shaft.

Preferably the clutch mechanism is of the dog clutch type and comprises a clutch driver element which is adjustable to allow axial alignment of the flightings and then locked in position by a securing bolt so that it is fast with the main drive shaft, and a driven clutch plate element axially movable with respect to the driver element for engaging and disengaging the drive.

Preferably, the clutch mechanism is constructed and arranged so that when an overload occurs, the driven clutch plate element will disengage from its driver element and drive to the auger intake flighting will cease and will not re-engage until the overload is cleared.

Preferably, drive is transmitted to the intake flighting shaft portion via a bodily rotatable coil spring mounted on the drive shaft between the driven clutch plate element and a drive coupling member on the intake flighting shaft portion.

The clutch assembly is arranged so that it will only disengage with a shock overload, and will not disengage under normal constant loading conditions.

Preferably the drive coupling member on the shaft portion of the intake flighting comprises a quick release cammed bush selectively rotatable and axially movable between a normally locked clutch engaging position and an unlocked position which disengages the clutch mechanism and thereby enables the intake flighting to be freely rotated about the drive shaft. This is desirable for maintenance reasons where an operator may wish to check that the intake flighting is freely rotating on the drive shaft. It is not unusual for some clogging to occur between the intake flighting shaft portion and the drive shaft on which it rotates—particularly where the auger is being used for conveying fertiliser materials and moisture penetrates into this region.

Desirably, the clutch mechanism is designed so that it will only engage when the intake flighting is properly aligned with the flighting on the main drive shaft, and in the event of the clutch temporarily slipping due to an overload, it will only reengage with the flightings properly re-aligned.

In order to more fully explain the present invention, two preferred embodiments thereof are described hereunder in some further detail with reference to and as illustrated in the accompanying drawings wherein:

FIG. 3 (b) is a view similar to FIG. 3 (a) showing the clutch in a disengaged state (by virtue of a shock overload);

FIG. 3 (c) is a view similar to FIG. 3 (a) showing the manner in which the clutch is disengaged by operation of the drive coupling member on the intake flighting shaft;

FIG. 4 is a transverse sectional view taken through the section of the intake flighting shown in FIG. 1; while

DETAILED DESCRIPTION OF THE PREFERRED EMBODIMENT

Figure 1:
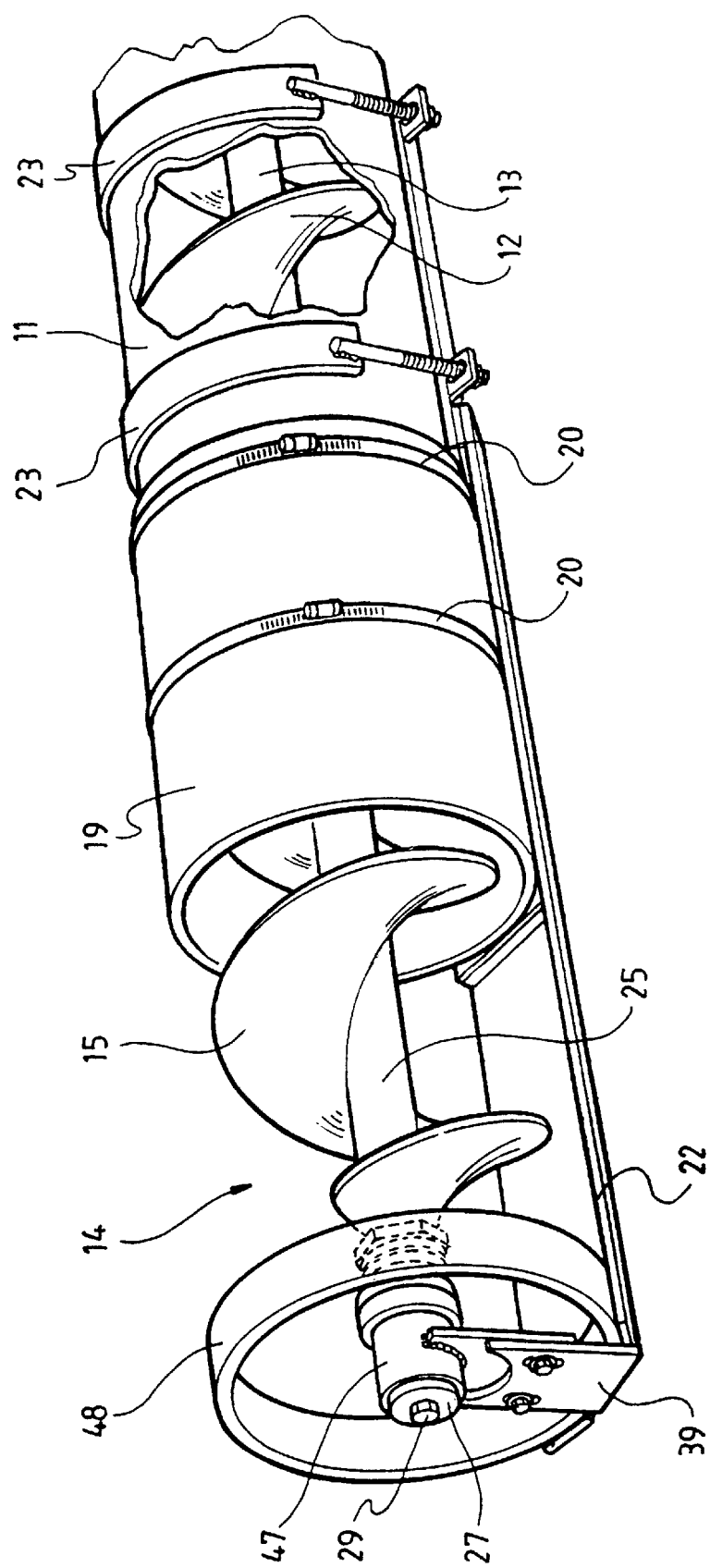
FIG. 1 is a fragmentary perspective view of an auger intake assembly fitted to the intake end of a conventional auger (which has had a portion of its shaft and flighting at the intake end thereof cut-off), according to a first embodiment.
Figure 2:
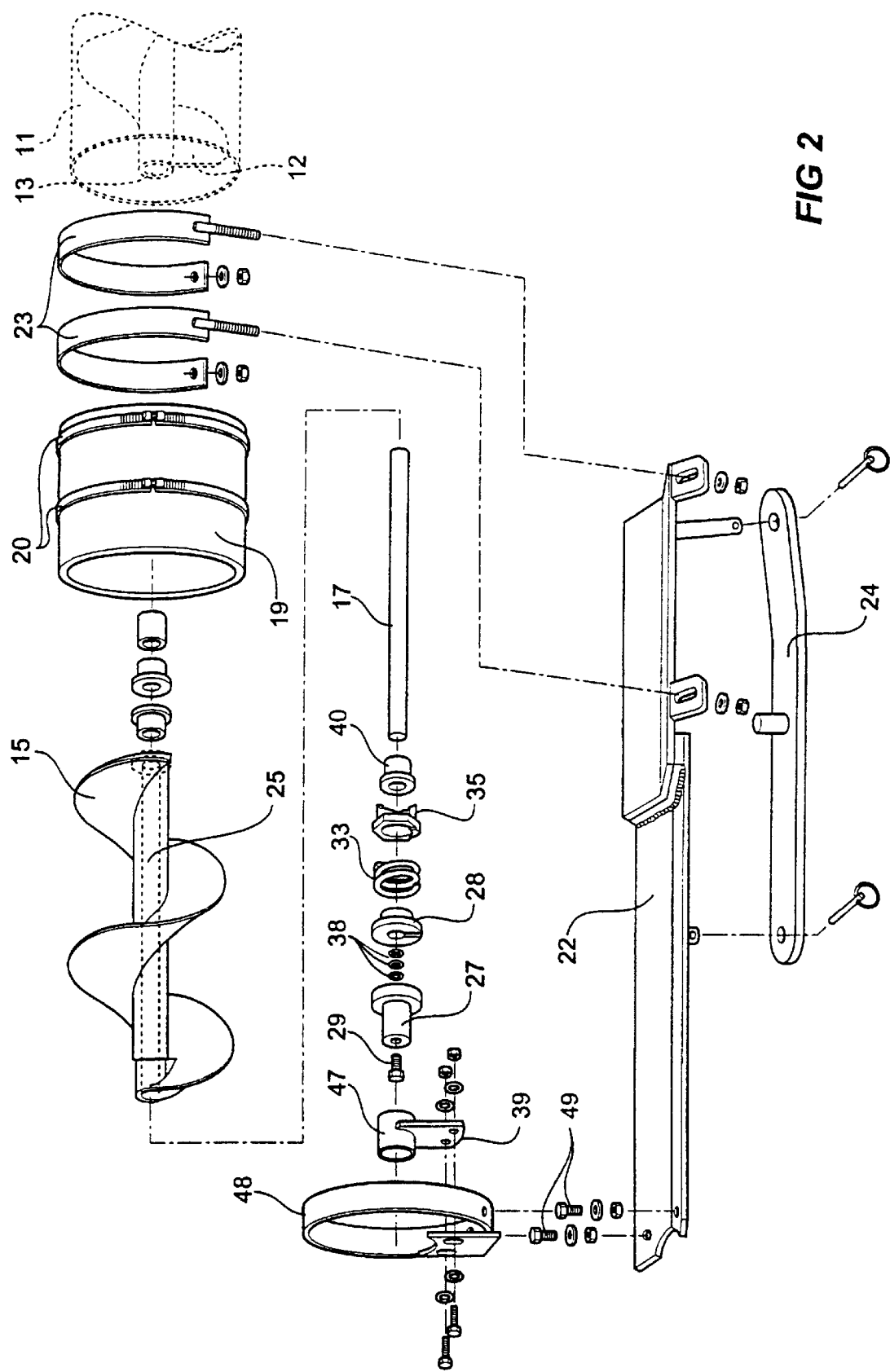
FIG. 2 is an exploded perspective view of the assembly shown in FIG. 1.

Referring to FIGS. 1 and 2 of the drawings, there is shown a material conveying auger assembly 10 which comprises an elongate tubular metal outer casing 11, a rotary feed metal screw 12 coaxially and rotatably mounted within the casing 11 on a main longitudinal tubular drive shaft 13 which is journalled in end bearings at opposite ends of the casing 11—all of which is conventional design. A portion of the screw 12 has been cut off from its intake or upstream end so as to permit the fitment of a replacement intake section 14.

The replacement auger intake section 14 includes flexible helical flighting 15 formed preferably of resilient pliable wear resistant polymeric material, eg polyurethane, having a Shore "A" hardness of 90, and which is rotatably and slidably mounted on a solid drive shaft extension portion 17 which is fitted to the main drive shaft 13 and forms a co-axial extension thereof. The shafts 13, 17 are joined to one another by means of a locating sleeve 18 welded to the end of the shaft portion 17 and which is inserted into the upstream end of the hollow main shaft 13 and fixed thereto by any suitable means, eg welding, so that the two shafts rotate as one.

In this embodiment the intake flighting 15 has a length approximating to two helical turns, with approximately 1½ turns being exposed (refer FIG. 1).

The open leading end of the main casing 11 has coaxially fitted thereto a soft rubber extension sleeve or collar 19 which encircles a portion, ie approximately one half turn, of the intake flighting 15. The extension sleeve 19 slidably fits over the open intake end of the casing 11 and is clamped thereto by means of wormdrive ring clamps 20. In this embodiment, the rubber for the sleeve 19 has a Shore "A" hardness of 45.

A metal supporting bar assembly 22 extends beneath the intake section 14 and is attached at its inner end by means of clamps 23 to the leading end of the casing 11, the outer end of the bar assembly 22 providing support for the outer end of the shaft extension piece 17. The support bar 22, in this embodiment has a draw-bar attachment 24 pivotally connected thereto and which can attach to a towing vehicle for transporting the auger 10.

The helical intake flighting 15 is attached to an elongate rigid tubular sleeve or shaft portion 25 which slidably locates on shaft portion 17, with the inner end of flighting 15 aligned with and abutting the leading end of flighting 12 on the main shaft 13. The shaft portion 25, in this embodiment, comprises an inner elongate rigid metal tube 25' around which is moulded an outer cylindrical layer 26 of polymeric material which is integrally formed with the flighting 15. The layer 26 and flighting 15 can be moulded simultaneously onto the steel tube 25'.

Figure 3A:
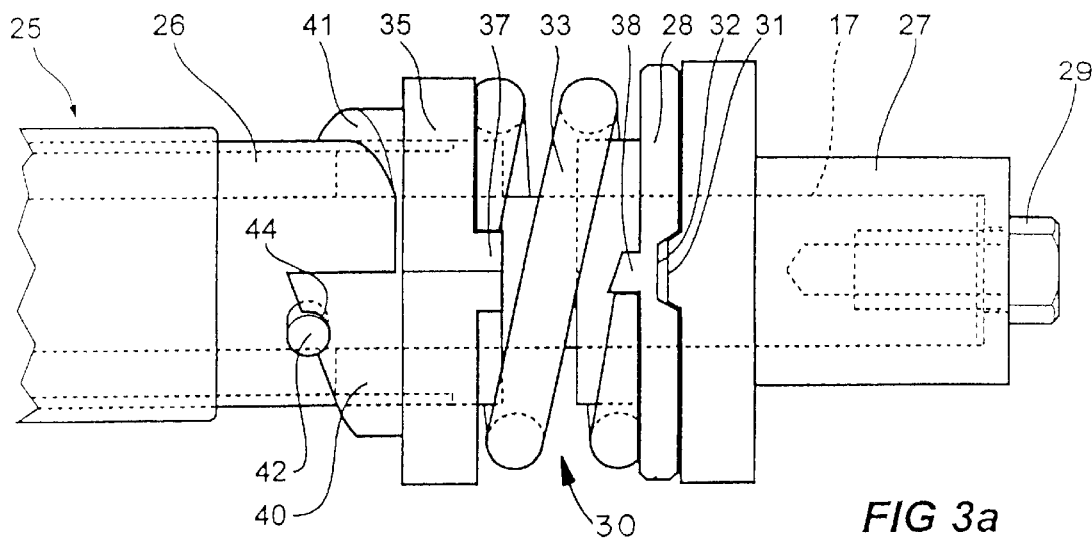
FIG. 3 (a) is a fragmentary elevational view of the outer end of the auger intake section showing only the clutch mechanism in its normally engaged position.
Figure 3B:
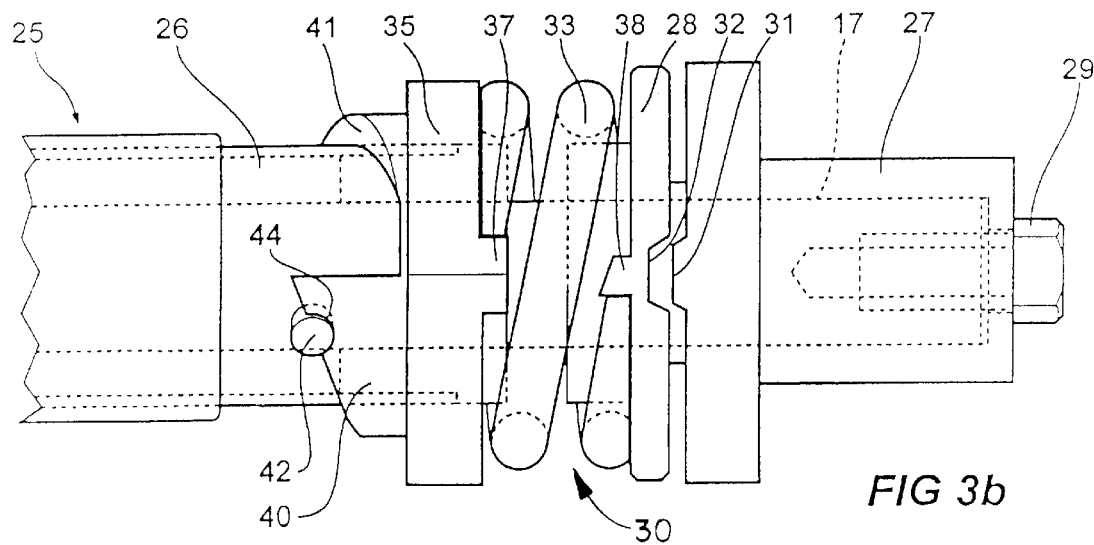
Figure 3C:
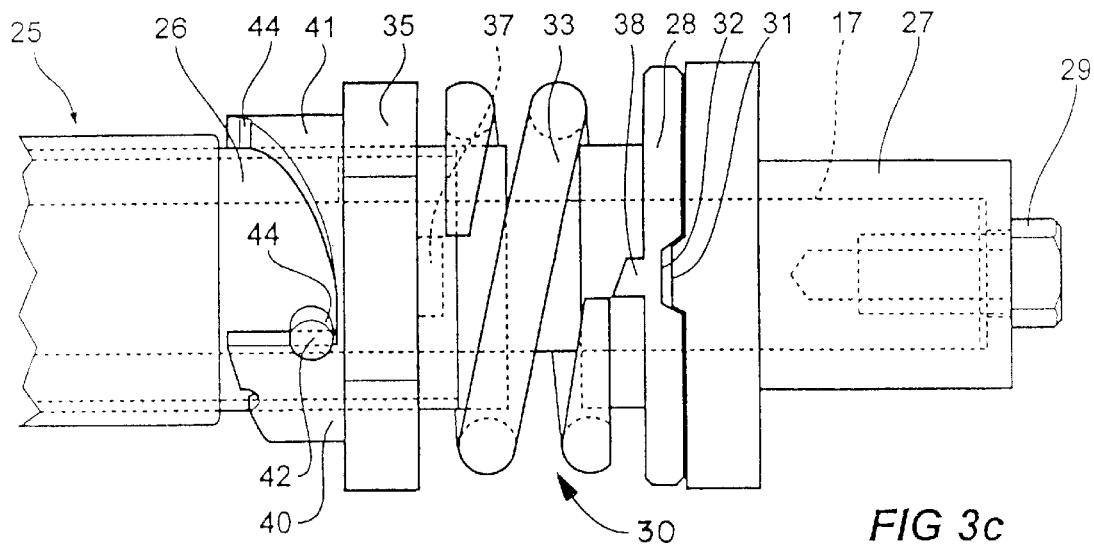
Figure 4:
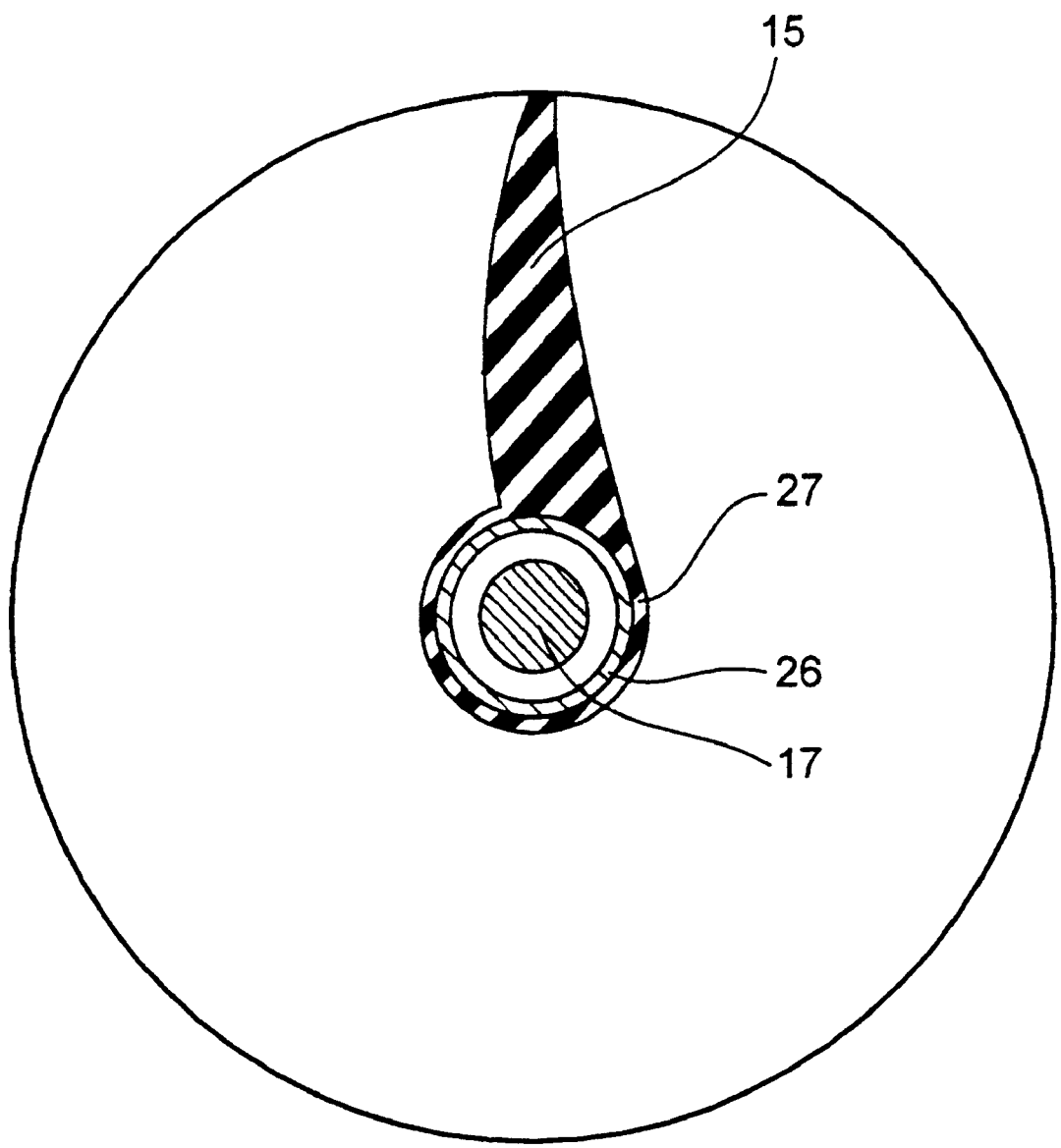

A dog clutch mechanism 30 is provided at the outer end of the drive shaft extension 17 to drivingly couple the intake flighting shaft portion 25 to the drive shaft 17. The clutch 30 is constructed so that it will automatically disengage drive to the shaft portion 25 in the event of an overload occurring (refer FIG. 3 (b)) whereupon the intake flighting 15 will stop rotating almost immediately while the main auger 12 will continue rotating.

In this embodiment the clutch mechanism 30 includes an outer driver clutch element 27, a driven clutch plate 28 engagable with the driver element 27, the driver 27 being fastened to the outer end of the shaft extension 17 by a securing bolt 29 so as to be fast therewith. The driver 27 has a single wedge-shaped radial drive lug 31 which, when the clutch is engaged, snugly engages in a complementary shaped radial slot 32 formed in the clutch plate 28. The clutch plate 28 is urged against the flange of driver 27 by means of a heavy duty compression spring 33 which is rotatably mounted on the shaft 17 between a quick release drive coupling member 35 on the shaft portion 25 of the intake flighting 15 and the clutch plate 28, with the opposite ends of the spring 33 abutting against axially projecting lugs 37, 38 fixedly secured to opposing inner faces of the member 35 and clutch plate 28 respectively. With the clutch 30 engaged, the ends of the spring 33 are held fixed relative to one another, and drive from the clutch driver 27 is transmitted through the spring 33, to the drive coupling 35 which is held fast with the shaft portion 25 of the flighting 15, to thereby rotate the flighting 15.

The amount of pre-tension or pre-load on the clutch mechanism 30 will depend on the degree to which the coil spring 33 is compressed when tightening the securing bolt 29. This can be reduced by means of spring metal shim washers 38 located on the securing bolt 29 against the end of shaft 17. The use of shim washers makes it difficult for the clutch to be over tensioned to a degree where it will not disengage.

The drive coupling member 35 slidably fits over the outer end of the shaft portion 25 of the flighting 15 and has an axial skirt 40 which has a pair of diametrically opposite cam edge surfaces 41 which are inclined with respect to the central axis of the tubular shaft portion 25. The tubular shaft portion 25 is provided with two fixed radially projecting diametrically opposed projections 42 which make camming engagement with the cam surfaces 41 when the member 35 is rotated relative to the shaft portion 25. The arrangement is such that the member 35 can be selectively rotated by hand or by a spanner, between a locked clutch engaging position wherein the projections 42 locate in notches 44 formed in the end circular edge of the skirt 40 and the member 35 and shaft portion 25 rotate together, and a clutch release position wherein the projections 42 are disengaged from their notches 44 and the clutch is released to permit the shaft portion 25 and its flighting 15 to rotate freely about the shaft 17. The camming engagement between projections 42 and cam surfaces 41 when the member 35 is rotated, causes the member 35 to slide axially inwards along the shaft portion 25, such axial shift causing the tension on spring 33 to be removed to in turn release the clutch and permit the flighting 15 to freely rotate about the shaft 17. This facility is useful for checking the free rotational movement of the flighting 15 on shaft 17 without the need to loosen the driver element 27—it being appreciated that there are instances where the shaft portion 25 may become "stuck" to shaft 17.

In the clutch engaging position, the flexible flighting 15 is exactly aligned with the metal flighting of the main auger screw 12, so that the flightings form a smooth continuous path for the material being fed through the auger.

The clutch element 27, in this embodiment, also serves as an end bearing for the outer end of shaft 17. The hollow cylindrical body portion of clutch element 27, is journalled within end bearing 47 which is fixed to a mounting plate 39 which is detachably fastened to a mounting ring 48 which in turn is secured to the support bar 22 adjacent its outer end by means of fasteners 49. The ring 48 provides protection for the flighting 15 when the intake end is inserted into a bin or hopper.

In order to fit the replaceable intake assembly 14 to an existing grain auger, it is necessary to firstly cut off an intake end portion of the main shaft and its flighting from the existing auger and then engage the end of the drive shaft extension 17, with the flighting 15 and clutch assembly 30 mounted thereon, within the open hollow end of the main drive shaft 13. With the securing bolt loosened, ie the clutch 30 disengaged, the intake flighting 15 is rotated so as to precisely align with the flighting on the main drive shaft, the clutch mechanism 30 engaged, and finally the securing bolt 29 is fully tightened to secure the clutch driver 27 to the shaft 17 and compress the spring 33.

In operation, drive is supplied to the main drive shaft 13 by conventional means, and this drive is transmitted to the shaft 17 and in turn to the intake section 14 by means of the clutch assembly 30. If a small obstruction; eg a hand or finger engages the intake flighting 15, the ability of the resilient flexible flighting 15 to bend and deform and the soft supple nature of the rubber sleeve which is fitted to the intake end of the auger will allow the hand or finger to be withdrawn without injury The use of the clutch mechanism provides an additional safety factor, in that should a large obstruction eg a leg or arm, become caught, drive to the intake flexible flighting 15 will automatically disengage (by virtue of the drive lug 31 "ramping" out of the groove 32 in the driven clutch plate) and the intake flighting will stop rotating almost immediately, whilst still permitting the remaining downstream section of flighting to continue rotating. With the intake flighting stationary, the obstruction can be removed. The two clutch elements 27, 28 will reengage automatically once the overload is cleared.

Figure 5:
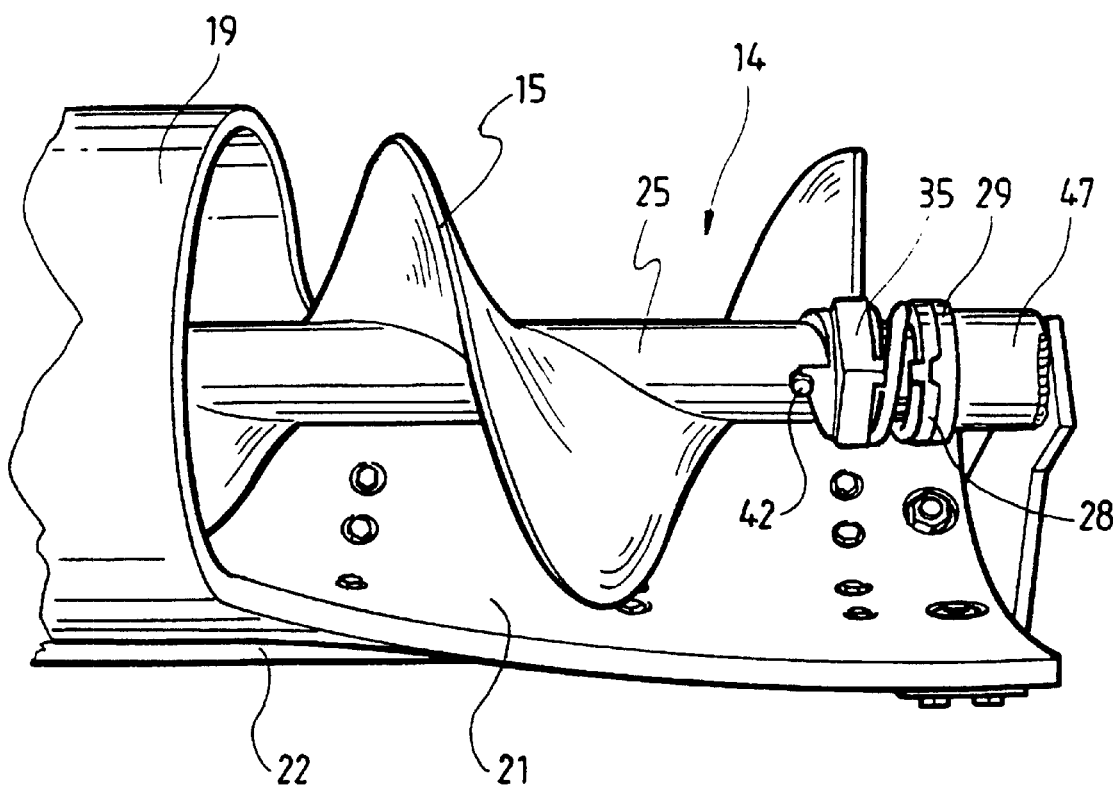
FIG. 5 is a fragmentary view of the auger intake end showing the intake flighting and an extension sleeve fitted to the end of the main auger casing, according to a second embodiment of the invention.

Referring to the embodiment shown in FIG. 5 of the drawings, the same item numbers are used to depict parts which correspond to those described in the first embodiment shown in FIGS. 1 to 4 of the drawings. The only variation is that the extension sleeve or collar 19 has integrally formed therewith an axially extending tray portion 21 which extends beneath the flighting 15 and is supported in position by the support bar assembly 22.

The tray portion is also formed of soft rubber or rubber-like material and is designed to assist the feeding of the grain into the intake end of auger as well as provide additional protection on the underside of the intake section 14. All other parts of the replaceable auger intake section 14 remain substantially the same as that previously described.

While the use of a clutch mechanism for drivingly coupling the intake end section to the main drive shaft is highly desirable, it will be realised that the requirement for a clutch mechanism is not essential. For example, the sleeve or shaft portion 25 on which the flexible flighting 15 is mounted may be formed integrally with shaft extension 17, or the tubular sleeve portion 25 can be rotatably mounted on the intake end shaft portion 17 and secured thereto by means of an overload safety shear pin which engages through aligned holes in the walls of portions 17 and 25.

It should also be realised that the clutch mechanism 30 may be designed so that the driven clutch plate 28 is keyed to the shaft portion 25 and thereby avoid having to transmit drive through the coil spring 33. A spring would still be required to bias the clutch plate 28 against its driver.

The construction of the deformable intake flighting 15 can be varied in a number of ways. In this embodiment, the flighting 15 is integrally moulded onto a stainless steel tube by means of radial metal keying lugs fixed to the outer surface of the metal tube 25' and which are embedded in the flighting where it connects to the shaft 25', thereby providing support for the flighting 15 at the base thereof. It would also be possible for the flights to be moulded to thin resilient internal metal carrier plates which are helically welded to the shaft 25' and which, after the moulding operation, are encapsulated by the resilient polymeric material used to form the flighting 15.

In addition, the auger may comprise several modular sections of flexible flighting having separately clutched connections therebetween. Furthermore, the feed intake of an auger may be located midway along its length, in which case the flexible flighting intake section will be fitted between sections of the drive shaft.

It should be appreciated that various modifications can be made to the invention as hereinabove described, and it is intended that the description contained herein hall be interpreted as illustrative only and not in a limiting sense.

The claims defining the invention are as follows:

1. A material conveying auger assembly of the type comprising an elongate tubular casing having an intake end and a discharge end, a main drive shaft extending co-axially through the casing and journalled for rotation therein, and helical flighting on said drive shaft, characterized by:
    an auger intake sub-assembly having an intake end drive shaft portion connected to said main shaft so as to rotate therewith, intake helical flighting on said intake end drive shaft portion and being formed of resilient flexible material,
    a soft pliable tubular extension sleeve attachable to the intake end of said casing so as to project axially outwards therefrom, said extension sleeve being arranged to encircle at least a portion of said intake flighting, and
    said intake end drive shaft portion securable to said main drive shaft so as to form an axial extension thereof, wherein said intake helical flighting is secured to a tubular shaft portion which is freely rotatably mounted on said intake end drive shaft portion, and drive coupling means operatively interconnecting said tubular shaft portion and said intake end drive shaft portion, wherein
    said drive coupling means comprises a clutch assembly which includes mating driver and driven clutch elements mounted on the outer end of said intake end drive shaft portion and which are normally in a clutch engaging position and operate to transmit drive to said intake flighting, said clutch elements being arranged, when the intake flighting is subjected to an overload condition, e.g. when an obstruction is caught in the intake end, to automatically disengage from one another so as to disengage drive to the intake flighting.

2. An auger assembly according to claim 1 wherein said drive coupling means includes a rotatable compression spring co-axially mounted on the intake end drive shaft portion, said driven clutch element being resiliently held against said driver clutch element by said spring, arranged so that drive to the tubular shaft portion is transmitted through the spring.

3. An auger assembly according to claim 1 wherein the drive coupling means includes a drive coupling member on the tubular shaft portion of the intake flighting selectively rotatable between a locked position wherein it is fast with said tubular shaft portion and rotates therewith and an unlocked position wherein it is disengaged and the helical flighting is free to rotate about the intake end drive shaft portion.

4. An auger assembly according to claim 3 wherein said drive coupling member is locked to the tubular shaft portion by means of a pair of diametrically opposed radial projections fixed to said tubular shaft portion, said projections engaging in respective notches formed in an inner end face of said drive coupling member.

5. An auger assembly according to claim 4 wherein said drive coupling member is provided with cam surfaces which make camming engagement with said projections when the member is rotated from its locked to its unlocked position, whereby the coupling member is caused to move axially inwards along the tubular shaft portion.

6. An auger assembly according to claim 1 wherein said intake flighting is formed from wear resistant polymeric material having a Shore "A" hardness value in the range 60–100.

7. An auger assembly according to claim 1 wherein said polymeric material is polyurethane having a Shore "A" hardness value of approximately 90.

8. An auger assembly according to claim 1 wherein said extension sleeve is formed of a pliable material.

9. An auger assembly according to claim 8 wherein said pliable material has a Shore "A" hardness value in the range 45–50.

10. An auger assembly according to claim 1 wherein said extension sleeve is arranged to slidably fit over the open intake end of the main casing and is clamped thereto by releasable clamping means.

11. An auger assembly according to claim 1 wherein the intake flighting is similar in diameter and configuration to the flighting on said main auger drive shaft.

12. An auger assembly according to claim 2 wherein the clutch driver element comprises a flanged bush having a through-bore formed therein, said bush being secured to the outer end of the intake end drive shaft by means of a securing bolt which passes through said through-bore and threadably engages in a threaded bore formed in the end of the drive shaft portion.

13. A material conveying auger assembly of the type comprising an elongate tubular casing having an intake end and a discharge end, a main drive shaft extending co-axially through the casing and journalled for rotation therein, and helical flighting on said drive shaft, characterized by:
    an auger intake subassembly comprising an intake end drive shaft having and inner end and an outer end, said inner end being secured coaxially to said main drive shaft so that the intake end drive shaft forms an axial extension thereof, a rotatable intake flighting tubular support shaft coaxially mounted in said intake end drive shaft, helical intake flighting secured to said tubular support shaft, said helical intake flighting being formed of resilient flexible war resistant material, and a clutch device operably coupling said intake end drive shaft and said intake flighting tubular shaft for simultaneous rotation, said clutch device being arranged so that in the event of an overload occurring at the intake end of the auger assembly, the clutch device will automatically disengage drive to the intake flighting tubular support shaft and the intake end drive shaft will continue to rotate without imparting a corresponding rotation to the helical intake flighting,
    a soft pliable tubular extension sleeve attachable to the intake end of said casing so as to project axially outwards therefrom, said extension sleeve being arranged to encircle at least a portion of said intake flighting, and support means fixed with respect to the casing for rotatably supporting said intake end drive shaft at said outer end.

14. Material conveying auger assembly according to claim 13 wherein said support means comprises an elongate support bar securable at its inner end to the tubular casing by releasable clamping means and arranged to extend longitudinally from said intake end beneath said intake helical flighting, and an upstanding support bracket fixed to the outer end of said support bar, said bracket having a bearing in which is journalled the outer end of the intake end drive shaft.

15. A material conveying auger assembly according to claim 13 wherein said clutch device comprises a clutch driver element fast with the intake end drive shaft and a driven clutch plate element in mating face to face relation with said driver element, said driver element comprising a radial lug on an inner face thereof which is engagable in a complementary shaped groove or slot formed in an end face of the driven clutch plate element and spring means biasing the clutch plate element against the driver element.

16. A material conveying auger assembly according to claim 13, wherein said intake flighting is formed from wear resistant polymeric material having a Shore "A" hardness value in the range of 60–100.

17. A material conveying auger assembly according to claim 13 wherein said extension sleeve is formed of soft, pliable rubber material.

18. A material conveying auger assembly according to claim 13, wherein said extension sleeve is arranged to slidably fit over the open end of the main casing and is clamped therearound by releasable circular clamping means.

19. A material conveying auger assembly of the type comprising an elongate tubular casing having an intake end and a discharge end, a main drive shaft extending co-axially through the casing and journalled for rotation therein, and helical flighting on said drive shaft, characterized by:

an auger intake sub assembly comprising an intake end drive shaft securable to said main drive shaft so as to form an axial extension thereof, an intake flighting tubular support shaft rotatably mounted coaxially on said intake drive shaft, intake helical flighting carried on said tubular shaft, said intake helical flighting being formed of resilient flexible, wear resistant material, drive coupling means operably coupling the intake flighting tubular support shaft and said intake end drive shaft, said drive coupling means comprising a driven coupling member on said tubular support shaft which is selectively rotatable between a locked position wherein the tubular support shaft is engaged for drive with said intake end drive shaft and an unlocked position wherein the drive to the tubular support shaft is disengaged and the intake flighting can freely rotate about the auger intake end drive shaft, a soft, pliable tubular extension sleeve attached to the intake end of said casing so as to project axially outwards therefrom, said extension sleeve being arranged to encircle at least a portion of said intake helical flighting, and means to rotatably support said intake end drive shaft at a location spaced from the open leading end of the extension sleeve.

20. A material conveying auger assembly according to claim 19, wherein said drive coupling means includes a clutch device mounted on said intake end drive shaft and which is arranged to transmit drive to said driven coupling member, said clutch device being arranged to automatically disengage in the event of a shock overload occurring at the intake end of the auger.

21. A material conveying auger assembly of the type comprising an elongate tubular casing having an intake end and a discharge end, a main drive shaft extending co-axially through the casing and journalled for rotation therein, and helical flighting on said drive shaft, characterised by:

an auger intake sub-assembly having an intake end drive shaft portion connected to said main shaft so as to rotate therewith, intake helical flighting on said intake end drive shaft portion and being formed of resilient flexible material a soft pliable tubular extension sleeve attachable to the intake end of said casing so as to project axially outwards therefrom, said extension sleeve being arranged to encircle at least a portion of said intake flighting, and a supporting bar assembly securable at its inner end to the main auger casing by releasable clamping means and arranged to extend longitudinally from said intake end beneath said intake helical flighting, said outer end of the bar assembly including a support bracket for rotatably supporting the outer end of the intake end drive shaft portion.

22. An auger assembly according to claim 21 wherein said drive coupling means includes a rotatable compression spring co-axially mounted on the intake end drive shaft portion, said driven clutch element being resiliently held against said driver clutch element by said spring, arranged so that drive to the tubular shaft portion is transmitted through the spring.

23. An auger assembly according to claim 21 wherein the drive coupling means includes a drive coupling member on the tubular shaft portion of the intake flighting selectively rotatable between a locked position wherein it is fast with said tubular shaft portion and rotates therewith and an unlocked position wherein it is disengaged and the helical flighting is free to rotate about the intake end drive shaft portion.

24. An auger assembly according to claim 21 wherein said drive coupling member is locked to the tubular shaft portion by means of a pair of diametrically opposed radial projections fixed to said tubular shaft portion, said projections engaging in respective notches formed in an inner end face of said drive coupling member.

25. An auger assembly according to claim 24 herein said drive coupling member is provided with cam surfaces which make camming engagement with said projections when the member is rotated from its locked to its unlocked position, whereby the coupling member is caused to move axially inwards along the tubular shaft portion.

26. An auger assembly according to claim 21 wherein said intake flighting is formed from wear resistant polymeric material having a Shore "A" hardness value in the range 60–100.

27. An auger assembly according to claim 21 wherein said polymeric material is polyurethane having a Shore "A" hardness value of approximately 90.

28. An auger assembly according to claim 21 wherein said extension sleeve is formed of a soft pliable rubber or rubber-like material.

29. An auger assembly according to claim 28 wherein said soft pliable rubber or rubber-like material has a Shore "A" hardness value in the range 45–50.

30. An auger assembly according to claim 21 wherein said extension sleeve is arranged to slidably fit over the open intake end of the main casing and is clamped thereto by releasable clamping means.

31. An auger assembly according to claim 21 further comprising a supporting bar assembly securable at its inner end to the main auger casing by releasable clamping means and arranged to extend longitudinally from said intake end beneath said intake section, said outer end of the bar assembly including a support bracket for rotatably supporting the outer end of the intake end drive shaft portion.

32. An auger assembly according to claim 21 wherein the intake flighting is similar in diameter and configuration to the flighting on said main auger drive shaft.

33. An auger assembly according to claim 22 wherein the clutch driver element comprises a flanged bush having a through-bore formed therein, said bush being secured to the outer end of the intake end drive shaft by means of a securing bolt which passes through said through-bore and threadably engages in a threaded bore formed in the end of the drive shaft portion.

34. An auger assembly according to claim 8 wherein said pliable material is rubber.

* * * * *